(12) United States Patent
Bhatnagar et al.

(10) Patent No.: US 7,716,469 B2
(45) Date of Patent: May 11, 2010

(54) METHOD AND SYSTEM FOR PROVIDING A CIRCLE OF TRUST ON A NETWORK

(75) Inventors: Bhavna Bhatnagar, Sunnyvale, CA (US); Ping Luo, Union City, CA (US); Qingwen Cheng, Fremont, CA (US); Shivaram Bhat, Sunnyvale, CA (US); Hong Xu, Palo Alto, CA (US); Wei Sun, Los Altos, CA (US); Aravindan Ranganathan, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1439 days.

(21) Appl. No.: 10/627,019

(22) Filed: Jul. 25, 2003

(65) Prior Publication Data

US 2005/0021964 A1    Jan. 27, 2005

(51) Int. Cl.
*H04L 29/06* (2006.01)
*H04L 9/32* (2006.01)
*G06F 7/04* (2006.01)

(52) U.S. Cl. .......................... 713/156; 713/173; 726/8
(58) Field of Classification Search ................. 713/156, 713/169, 175; 726/8
See application file for complete search history.

(56) References Cited

U.S. PATENT DOCUMENTS

| 6,826,690 | B1 * | 11/2004 | Hind et al. .................. 713/186 |
| 2001/0027440 | A1 * | 10/2001 | Tanaka et al. ................ 705/39 |
| 2003/0188156 | A1 * | 10/2003 | Yasala et al. ................ 713/156 |
| 2004/0003251 | A1 * | 1/2004 | Narin et al. .................. 713/172 |
| 2004/0128392 | A1 * | 7/2004 | Blakley et al. .............. 709/229 |

* cited by examiner

*Primary Examiner*—Benjamin E Lanier
(74) *Attorney, Agent, or Firm*—Osha • Liang LLP

(57) ABSTRACT

Embodiments of the present invention provide a circle of trust on a network. The circle of trust is configured by exchanging credential of a first and a second affiliated entity. The credentials of the first affiliated entity is stored in a trusted partner list of the second affiliated entity. The credentials of the second affiliated entity is stored in a trusted partner list of the first affiliated entity. Thereafter, a circle of trust session may be provided when a client device initiates use of a resource on a relying party device by providing an authentication assertion reference. The identity of the issuing party of the authentication assertion reference. The relying party sends an authentication query containing its credential to the issuing party. The issuing party determines if the relying party is a trusted entity based upon whether the relying party's credential is contained in the trusted partner list of the issuing party.

13 Claims, 7 Drawing Sheets

METHOD AND SYSTEM FOR PROVIDING A CIRCLE OF TRUST ON A NETWORK

FIELD OF THE INVENTION

Embodiments of the present invention relate to network security, and more particularly to providing a circle of trust among a plurality of associated entities.

BACKGROUND OF THE INVENTION

Referring to FIG. 1, a block diagram of a network according to the conventional art is shown. As depicted in FIG. 1, a plurality of organizations 105, 110, 115 are communicatively coupled by one or more communication channels 180 185, such as the internet or extranet. Each organization 105, 110, 115 typically comprises a plurality of client devices 120-150 communicatively coupled to one or more servers 155-175. The servers 155-175 provide one or more resources, such as execution of applications and/or storage of information.

A user on a client device 120-150 may be granted or denied access to resources of a particular server 155-175. In the conventional art, the client 120 logs-on to a particular organization's server 155, wherein the user provides a user name, password and/or the like. Based upon the user name, password and the like, the server 155 authenticates the client 120 and determines the client's 120 authorization to access particular resources.

If the client 120 then tries to access resource on another server 170, 175, establishing authentication and utilizing resources is problematic. The other servers 170, 175 do not know that the client device has been authenticated by a particular server 155. The other servers 170, 175 do not know that they can trust the authentication provided by the particular server 155. Furthermore, each entity 105, 110, 115 and/or server 155-175 may have a different login script, may require a different protocol, may store information in a different structure, format and/or the like. Therefore, the client typically has to sign-on to each server 155-175 separately.

For example, a user may wish to access resources on various entities 105-115 during the course of their work, such as using the internet to make travel arrangements. The user first logs-on to the company's network server 155 utilizing a client device 125. The user may manually or via a script, enter their user name and password in order to logon to the network server 155. The network server 155 provides an internet portal.

The user may then navigate using a browser to the website of an airline 115. The user will likely be required to enter a user name, password and the like to book a flight using a corporate account. Similarly, the user may then navigate to a car rental agency to reserve a rental car. Once again, the user may be requested to enter a name, password and the like to reserve the car. Similarly, the user may also navigate to a website of a hotel chain to reserve a room. Once again, the user may be requested to enter a name, password and the like to reserve the room. The need to logon to each entity's server 155 reduces the user's satisfaction and productivity.

The need to logon multiple times is not limited to multiple entities' servers 170, 175. For example, the user may login to their employer's network server 155 to access the finance server 160. The user may again be required to enter a username, password and the like in order to enter expenses, such as meals, entertainment and gas, incurred during their business travel. The user may then wish to check their retirement account. Once again the user may be required to provide a username, password and the like to access the payroll server 165 in order to check their retirement account. In addition to reducing the user's satisfaction and productivity, the implementation of multiple logon scripts increases the cost of doing business.

Versions of single sign-on services have existed for several years. However, the conventional art single sign-on services are closed solutions that do not offer broad interoperability. Accordingly, the Security Assertion Markup Language (SAML) specification is intended to provide a solution allowing single sign-on for secure authentication and authorization.

SAML is an eXtensible Markup Language (XML) standard designed for business-to-business (B2B) and business-to-consumer (B2C) transactions. The SAML standard is designed for the exchange of secure sign-on information between a user, a relying party, and/or an issuing party. Furthermore, SAML allows issuing parties to use their own chosen methods of authentication (e.g., personal key identifier (PKI), hash, password, or the like).

In one implementation, a SAML-compliant service, called a relying party, sends a SAML request to an issuing party, which returns a SAML assertion. Assertions do not create a secure authentication. The security service is responsible for providing a secure authentication. Assertions are coded statements generated about events, such as authentication, that have already occurred, as when the user provided the correct user name and password, or the security mechanism granted specific permissions.

Referring now to FIG. 2A, an exemplary SAML request/assertion according to the conventional art is shown. As depicted in FIG. 2A, SAML requests and assertions 210 are transmitted within a SOAP envelope 215 via HTTP 220.

Referring now to FIG. 2B, an exemplary SAML data packet according to the conventional art is shown. As depicted in FIG. 2B, the data packet comprises an HTTP header 250, a SOAP header 255 and a SAML payload 260. An assertion or response is encoded into the SAML payload 260. A SOAP header 255 is then generated and attached to the SAML payload 260. An HTTP header 250 is then generated and attached to the SOAP header 255 and SAML payload 260. The SAML payload containing an assertion or request may comprise an issuer identifier, an assertion identifier, an optional subject, an optional advice, a condition, an audience restriction, a target restriction, and an application specific condition.

Upon receipt, the HTTP header 250 is processed to provide routing and flow control. The SOAP header 255 is then processed to provide information concerning the content of the payload and how to process it. The SAML payload 260 may then be processed to provide security information.

SUMMARY OF THE INVENTION

Embodiments of the present invention provide a circle of trust on a network. The circle of trust provides affiliated entities a means for determining that a user has been authenticated. The circle of trust also provides the affiliated entities a means for determining whether they can trust the authentication provided by another entity. Embodiments of the present invention provide for configuring a plurality of affiliated entities to establish a circle of trust. Embodiments of the present invention also provide for a circle of trust session.

In one embodiment of the present invention, the method of providing a circle of trust comprises exchanging a first certificate of a first affiliated and a second affiliated entity. The credential of the first affiliated entity is stored in a trusted partner list of the second affiliated entity. The credential of the second affiliated entity is stored in a trusted partner list of the first affiliated entity. Thereafter, a circle of trust session may be provided when a client device initiates use of a resource on a relying party device by providing an authentication assertion reference. The identity of the issuing party of the authentication is determined as a function of the authentication assertion reference. The relying party sends an authentication request containing its credential to the issuing party The issuing party determines if the relying party is a trusted entity based upon whether the relying party's credential is contained in the trusted partner list of the issuing party.

In another embodiment of the present invention, the circle of trust comprises a plurality of affiliated entities. Each affiliated entity in a circle of trust comprises an administration module, a trusted partner list, a session module and/or an authentication module. The administration modules provide for the exchange of credentials between each affiliated entity. The administration modules also cause the credentials to be saved on each of the corresponding trusted partner lists. The session modules provide for generating and processing authentication requests and assertions. The session modules also provide for determining the identity of an issuing party as a function of an authentication assertion reference. The session modules also provide for determining a trusted status of a particular affiliated entity as a function of a certificate received from a relying party.

Accordingly, embodiments of the present invention provide single sign-on for secure authentication and authorization. Embodiments of the present invention enable open and interoperable designs for web-based single sign-on service functionality. Furthermore, embodiments of the present invention allow each affiliated entity to use their own chosen methods of authentication (e.g., personal key identifier (PKI), hash, password, or the like). Hence, the above-described advantageous provided by embodiments of the present invention increase user satisfaction and productivity.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1:
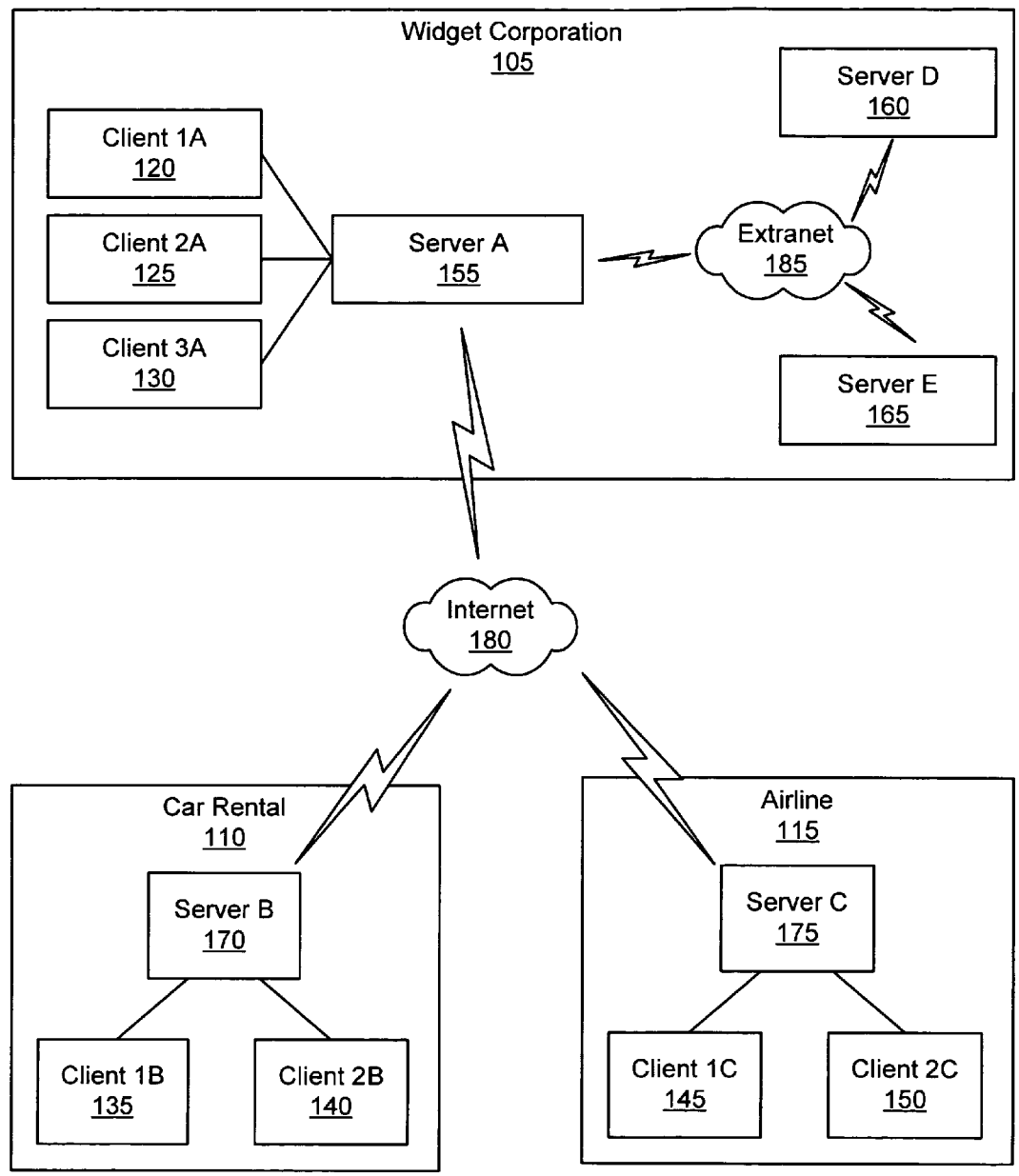
FIG. 1 shows a block diagram of a network according to the conventional art.
Figure 2A:
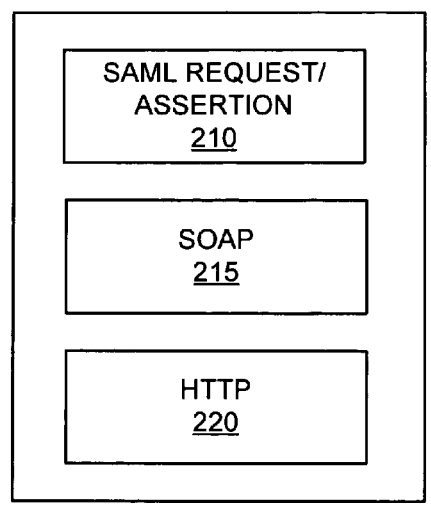
FIG. 2A shows an exemplary SAML request/assertion according to the conventional art.
Figure 2B:
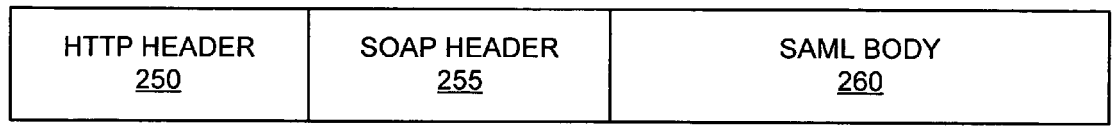
FIG. 2B shows an exemplary SAML data packet according to the conventional art.
Figure 3:
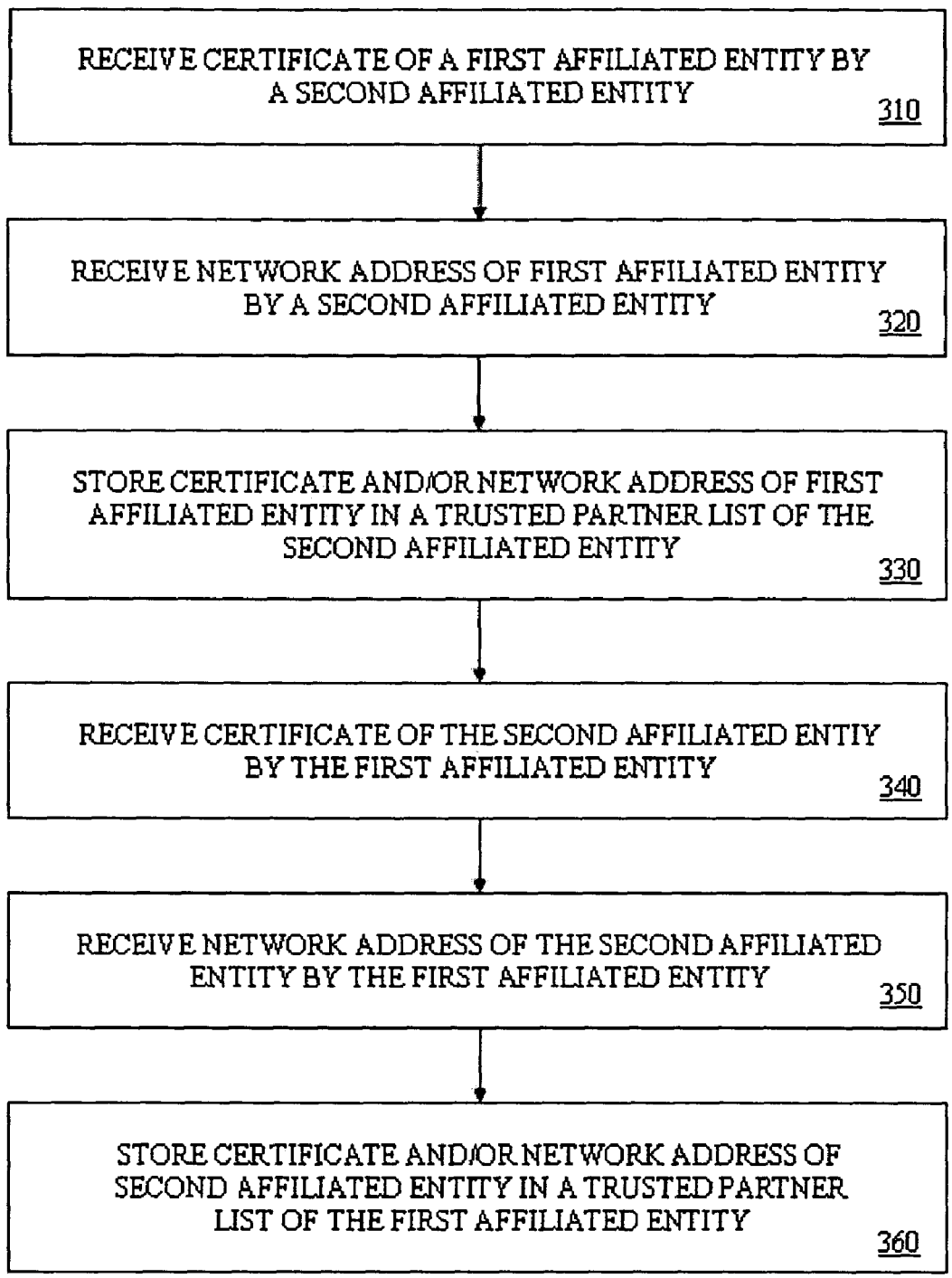
FIG. 3 shows a flow diagram of a computer implemented method of configuring a circle of trust between a first and second affiliated entity, in accordance with one embodiment of the present invention.

Referring now to FIG. 3, a flow diagram of a computer-implemented method of configuring a circle between a first and second affiliated entity, in accordance with one embodiment of the present invention, is shown. The method of the present embodiment may be realized as a series of instructions (e.g., code) and information (e.g.,data) that reside on a computer-readable medium, such as computer memory, and are executed and manipulated by a processor to implement the process of configuring a circle of trust. As depicted in FIG. 3, the method comprises receiving a certificate of the first affiliated entity by a second affiliated entity, at step 310. The certificate of the first affiliated entity is stored in a trusted partner list accessible to the second affiliated entity, at step 330. The method further comprises receiving a certificate of the second affiliated entity by the first affiliated entity, at step 340. The certificate of the second affiliated entity is stored in a trusted partner list accessible to the first affiliated entity, at step 360.

The method may be repeated for each pair of affiliated entities in the network. Thus, the trusted partner list for each entity will contain a record, comprising the certificate, for each entity on the network that is affiliated with the particular entity.

In another embodiment of the present invention, the method comprises the steps 310, 330, 340 and 360 of the above-described embodiment. The method further comprises receiving a network address of the first affiliated entity, at step 320. The network address of the first affiliated entity is stored in the trusted partner list accessible to the second affiliated entity by the first affiliated entity, at step 350. The network address of the second affiliated entity is stored in the trusted partner list accessible to the first affiliated entity, at step 360.

The method may be repeated for each pair of affiliated entities in the network. Thus, the trusted partner list for each entity will contain a record, comprising the certificate and a network address, for each entity on the network that is affiliated with the particular entity.

In yet another embodiment of the present invention, the method comprises receiving a network address of the first affiliated entity by a third affiliated entity. The network address of the first affiliated entity is stored in a trusted partner list accessible to the third affiliated entity. The method further comprises receiving a network address of the third affiliated entity by the first affiliated entity. The network address of the third affiliated entity is stored in a trusted partner list accessible to the first affiliated entity.

Figure 4:
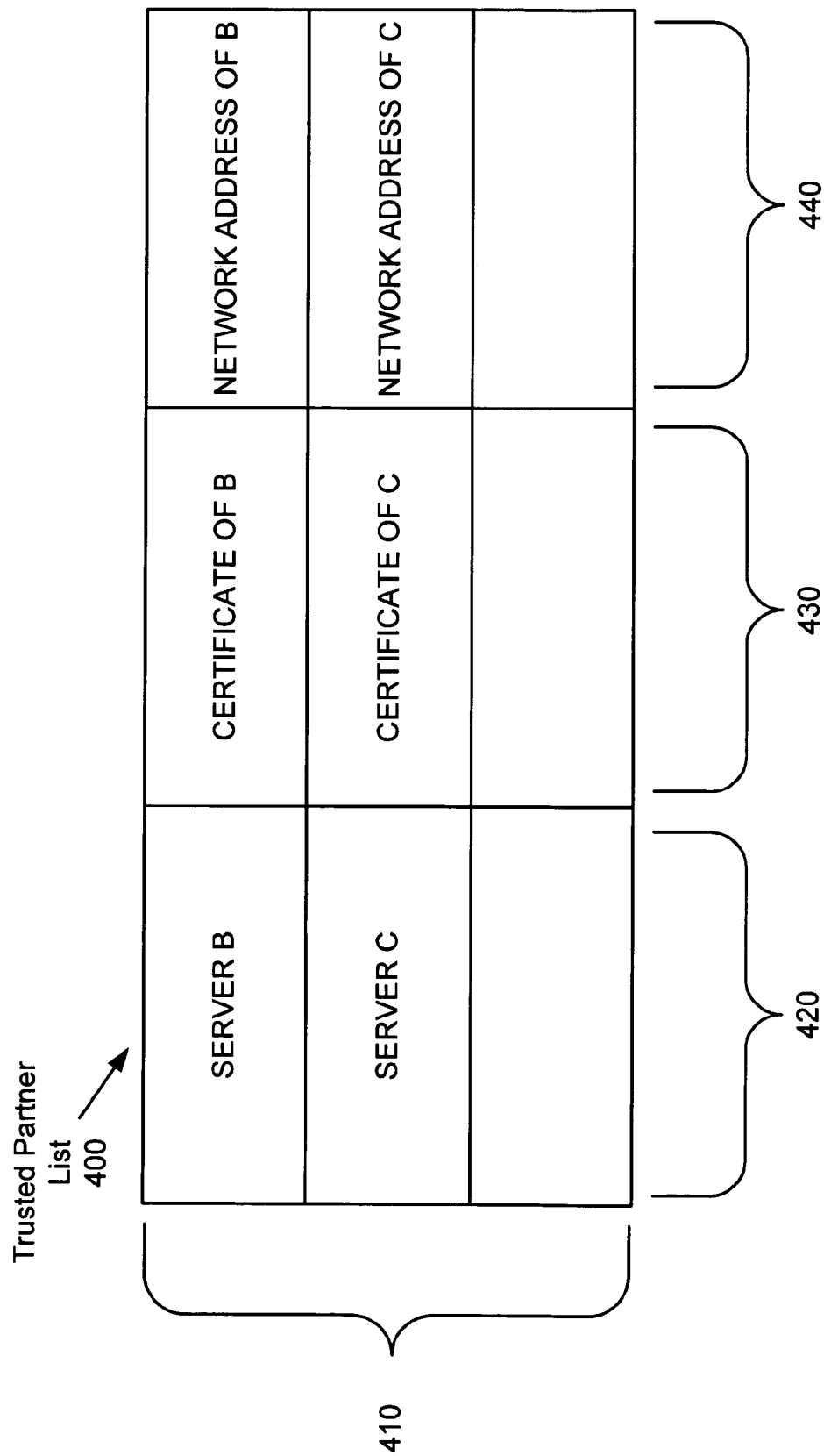
FIG. 4 shows an exemplary trusted partner list, in accordance with one embodiment of the present invention.

The method may be repeated for each pair of affiliated entities in the network. Thus, the trusted partner list for each entity will contain a record, comprising the network address, for each entity on the network that is affiliated with the particular entity. Furthermore, any combination of the above-described three embodiments may be utilized. Thus, the trusted partner list of a given entity may contain a record for each entity on the network that is affiliated with the particular entity. The record of each of the trusted partners may comprise the corresponding certificate, network address, and/or the like, Referring now to FIG. 4, an exemplary trusted partner list, in accordance with one embodiment of the present invention, is shown. The trusted partner list 400 comprises a plurality of records 410. In one implementation, each record 410 comprises an identifier of the particular trusted entity 420 and a certificate corresponding to the particular trusted entity 430. In another implementation, each record 410 comprises an identifier of the particular trusted entity 420 and a network address (e.g., an internet protocol (IP) address) 440. In yet another implementation, each record 410 comprises an identifier of the particular trusted entity 420, a certificate corresponding to the particular trusted entity 430, and a network address 440 corresponding to the particular trusted entity. For example, the trusted partner list for Server A may comprise identifiers for servers B and C, certificates of B and C, and network address of B and C, respectively.

Figure 5:
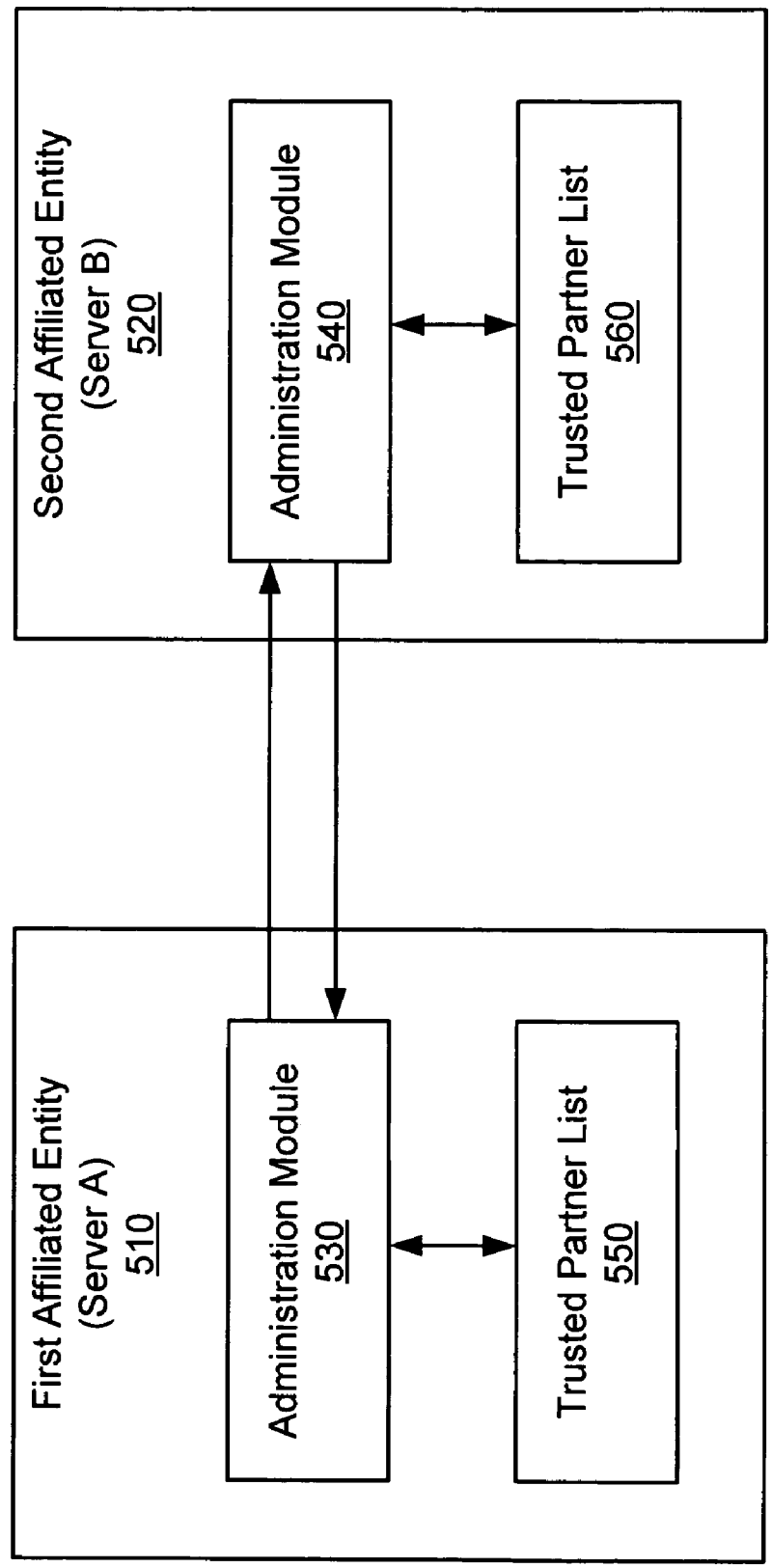
FIG. 5 shows a block diagram of a system providing for configuring a circle of trust, in accordance with one embodiment of the present invention.

Referring now to FIG. 5, a block diagram of a system providing for configuring a circle of trust, in accordance with one embodiment of the present invention, is shown. As depicted in FIG. 5, each affiliated entity (e.g., server A and B) 510, 520 provides for configuring the circle of trust utilizing an administration module 530, 540 and a trusted partner list 550, 560. The administration modules 530, 540 of each affiliated entity 510, 520 provide for the exchange of credentials and storage thereof in a corresponding trusted partner list 550, 560. The credential may comprise one or more certificates (e.g., cert1, cert2, cert3), one or more network addresses (e.g., ip1, ip2, ip3) and/or the like. Accordingly, a request sent from any of the network addresses and/or a request containing any one of the certificates indicated in the credential will be acceptable.

In one implementation, the administration module 530, 540 of the first affiliated entity 510 (e.g., server A) transmits a certificate of the first affiliated entity 510 to the second affiliated entity 520 (e.g., server B). The administration module 540 of the second affiliated entity 520 receives the certificate of first affiliated entity 510 and stores it as a record in the trusted partner list 560 of the second affiliated entity 520. The administration module 540 of the second affiliated entity 520 transmits the certificate of the second affiliated entity 520 to the first affiliated entity 510. The administration module 530 of the first affiliated entity 510 receives the credential of the second affiliated entity 520 and stores it as a record in the trusted partner list 550 of the first affiliate entity 510.

Alternatively, the exchange of certificates may be performed out-of-band (e.g., manually) and then loaded into the respective trusted partner list as per individual design. For example, one entity may user some kind of certification utility to import and store the received certificate.

In another embodiment, the administration module 530 of the first affiliated entity 510 transmits a network address, such as an internet protocol (IP) address, of the first affiliated entity 510 to the second affiliated entity 520. The administration module 540 of the second affiliated entity 520 receives the network address of the first affiliated entity 510 and stores it as a record in the trusted partner list 560 of the second affiliated entity 520. The administration module 540 of the second affiliated entity 520 transmits the network address of the second affiliated entity 520 to the first affiliated entity 510. The administration module 530 of the first affiliated entity 510 receives the network address of the second affiliated entity 520 and stores it as a record in the trusted partner list 550 of the first affiliated entity 510.

Figure 6:
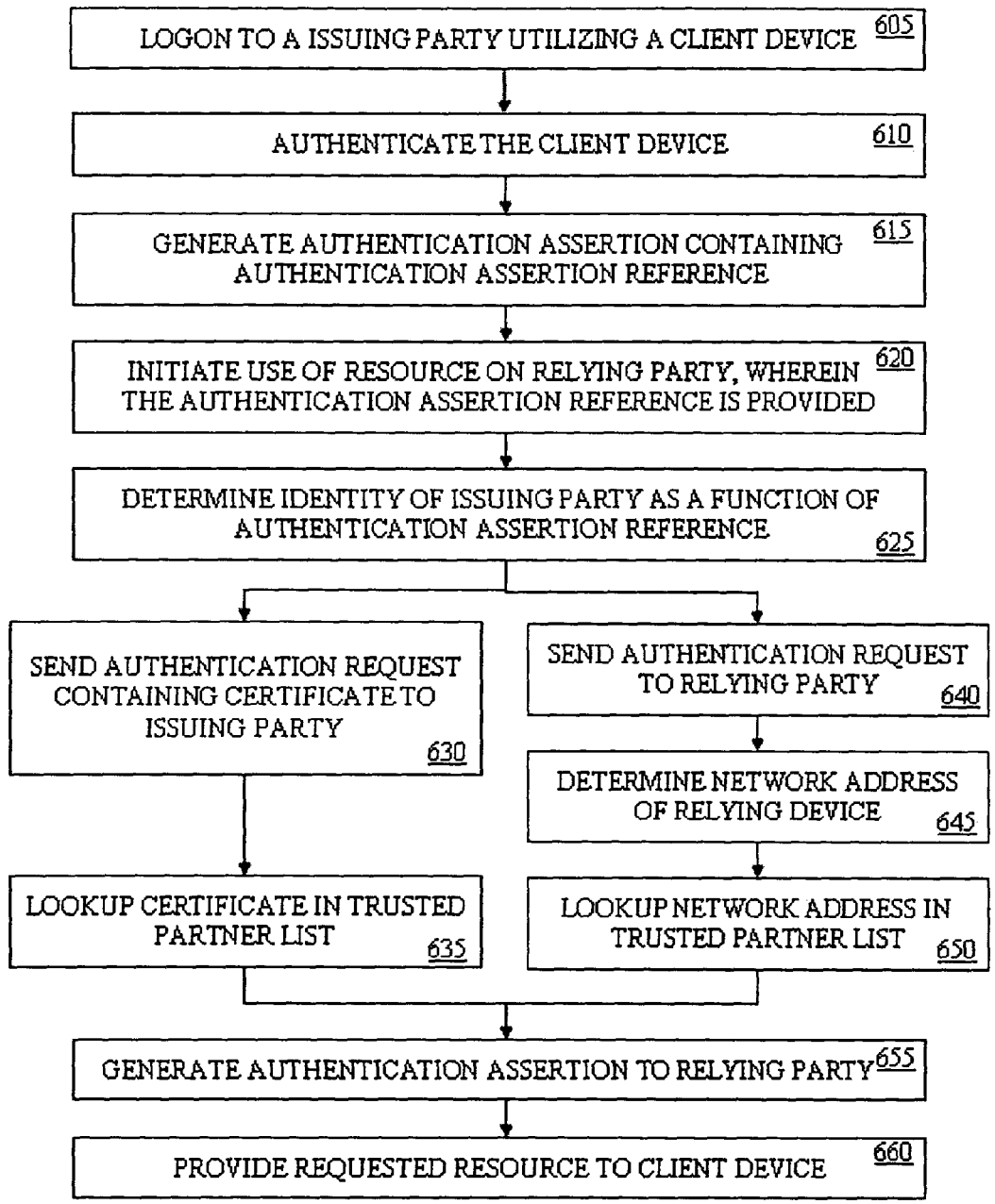
FIG. 6 shows a flow diagram of a computer implemented method of providing a circle of trust session between a first and second affiliated entity, in accordance with one embodiment of the present invention.

Referring now to FIG. 6, a flow diagram of a computer implemented method of providing a circle of trust session between a first and second affiliated entity, in accordance with one embodiment of the present invention, is shown. The method of the present embodiment may be realized as a series of instructions (e.g., code) and information (e.g., data) that reside on a computer-readable medium, such as computer memory, and are executed and manipulated by a processor. When executed, the instructions cause the processor to implement the process of providing a circle of trust session. As depicted in FIG. 6, the method begins with a user on a client device logging onto an issuing party (e.g., first affiliated entity), at step 605. The user provides a user name, password and/or the like when logging in. The issuing party authenticates the client device, at step 610. The authentication process may comprise a simple password, a personal key identifier (PKI), a hashing function or the like.

Upon authentication of the user, the issuing party returns an authentication assertion reference to the client device, at step 615. When initiating use of a resource on another device, referred to as a relying party (e.g., second affiliated entity), the client device passes the authentication assertion reference to the particular relying party, at step 620. The relying party determines the identity of the issuing party as a function of the authentication assertion reference, at step 625.

If communication is being provided over a single socket layer (SSL) HTTP protocol or the like, the relying party sends an authentication request containing the certificate of the relying party to the issuing party, 630. The issuing party looks up the certificate in a trusted partner list, at 635. If the issuing party finds a match for the certificate in the issuing party's trusted partner list, the issuing party thereby knows the identity of the relying party and that the relying party is a trusted partner.

The issuing party thereafter returns an authentication assertion to the relying party, at 655. The authentication assertion states that the client device was, in fact, authenticated by a particular method at a specific time and the like information. The relying party then provides the client device with the requested resource without requiring the user to separately logon to the relying party, at step 660.

If communication is being provided over a non-single socket layer (SSL) HTTP protocol or the like, the relying party sends an authentication request to the issuing party, at step 640. The issuing party parses the header of the communication packet to determine a network address of the relying party, at step 645. The issuing party looks up the network address in a trusted partner list, at step 650. If the issuing party finds a match for the network address in the issuing party's trusted partner list, the issuing party thereby knows the identity of the relying party and that the relying party is a trusted partner.

Again, the issuing party returns an authentication assertion to the relying party, at step 655. The authentication assertion states that the client device was, in fact, authenticated by a particular method at a specific time and the like information. The relying party then provides the client device with the requested resource without requiring the user to separately logon to the relying party, at step 660.

Figure 7:
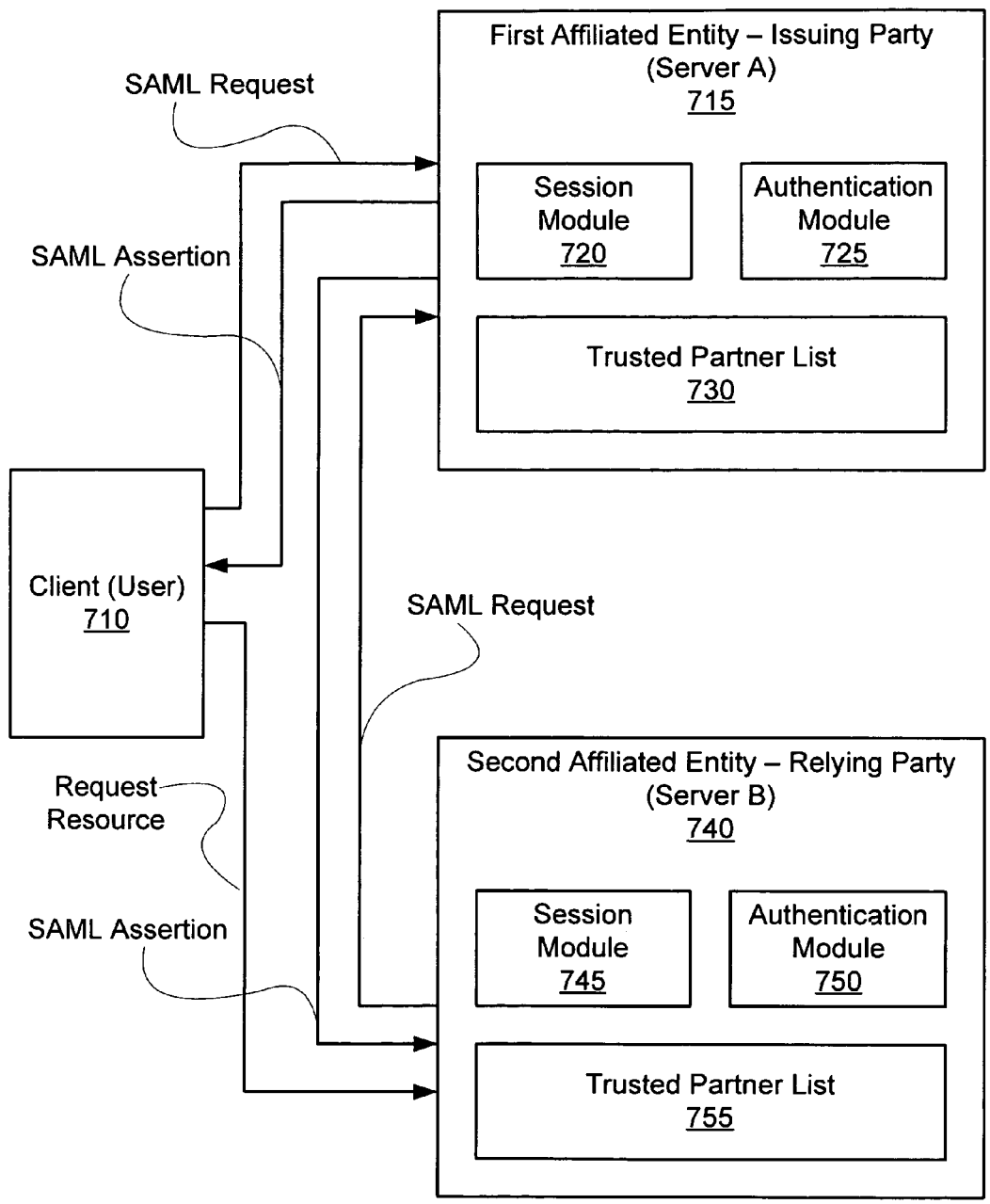
FIG. 7 shows a block diagram of a system providing for a circle of trust session, in accordance with one embodiment of the present invention.

Referring now to FIG. 7, a block diagram of a system providing for a circle of trust session, in accordance with one embodiment of the present invention, is shown. As depicted in FIG. 7, the circle of trust session comprises a client device 710, an issuing party (e.g., first affiliated entity) 715 and a relying party (e.g., second affiliated entity) 740. During the circle of trust session, a user login request is passed by the client device 710 to the issuing party 715 by a SAML authentication request. The authentication request is transmitted from the client device 710 to the authentication module 725 of the issuing party 715. The authentication request, containing the user name, password and the like, is passed within a SOAP envelope via HTTP. The authentication module 725 processes the packet to retrieve the user name, password and the like.

The user name, password and the like is passed to an authentication module 725 of the issuing party 715. The authentication process provided by the authentication module 725 may comprises a simple password, a personal key identifier (PKI), a hashing function or the like. The authentication module 725 returns a SAML authentication assertion to the client device 710, if the authentication process is successful. The authentication assertion comprises an authentication assertion reference.

The client device 710 passes the authentication assertion reference to each relying party (e.g., server B) 740 when initiating use of resources thereon. The relying party 720 can determine the particular issuing party 715, which authenticated the client 710, from the authentication assertion reference. Therefore, the relying party 740 sends a SAML authentication query to the issuing party 715.

In one implementation, if the communication is provided over a single socket layer (SSL) HTTP protocol, the SAML authentication query, transmitted by the session module 745 of the rely party 740 to the session module 720 of the issuing party 715, contains the relying party's 720 certificate. Upon receipt of the authentication query, the session module 720 of the issuing party 715 looks up the certificate in its trusted partner list 730. If a match is found in the issuing party's 715 trusted partner list 730, the trusted party 715 knows that the relying party 740 is the requesting entity and that the relying party 740 can be trusted. Therefore, the session module 720 of the issuing party 715 returns a SAML authentication assertion to the session module 745 of the relying party 740. The SAML authentication assertion states that the client device 710 was, in fact, authenticated by a particular method at a specific time and the like information.

In another implementation, if the communication is provided over a non-single socket layer (SSL) protocol, the relying party's 740 network address, such as its internet protocol (IP) address, is determined from the transmission layer protocol header, such as the HTTP header. The session module 720 of the issuing party 715 looks up the network address in its trusted partner list 730. If a match is found in the issuing party's 715 trusted partner list 730, the trusted party 715 knows that the relying party 740 is the requesting entity and that the relying party 740 can be trusted. Therefore, the session module 720 of the issuing party 715 returns a SAML authentication assertion to the session module 745 of the relying party 740. The SAML authentication assertion states that the client device 710 was, in fact, authenticated by a particular method at a specific time and the like information.

Accordingly, embodiments of the present invention provide an open and interoperable single sign-on for secure authentication and authorization. Embodiments of the present invention also provide affiliated entities a means for determining that a user has been authenticated. Embodiments of the present invention also provide the affiliated entities a means for determining whether they can trust the authentication provided by another entity. Furthermore, embodiments of the present invention allow each affiliated entity to use their own chosen methods of authentication (e.g., personal key identifier (PKI), hash, password, or the like). Hence, the above-described systems and methods, provided by embodiments of the present invention, advantageously increase user satisfaction and productivity.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for granting access to a resource comprising:
   sending a first authentication request to a first server;
   receiving, in response to the first authentication request, an authentication assertion reference from the first server;
   sending, to a second server, a request to access the resource operatively connected to the second server,
      wherein the request comprises the authentication assertion reference,
      wherein, in response to the request, the second server sends the first server a second authentication request comprising a certificate associated with the second server,
      wherein the first server, in response to the second authentication request, determines whether the certificate is present in a trusted partner list maintained by the first server, and
      wherein the first server, in response to determining whether the certificate is present in the trusted partner list, sends an authentication assertion to the second server; and
   receiving a grant of access to the resource from the second server, wherein the second server grants access to the resource based on the authentication assertion.

2. The method of claim 1, wherein prior to sending the first server the second authentication request, the second server identifies the first server using the authentication assertion reference.

3. The method of claim 1, wherein sending a first authentication request to the first server comprises providing the first server with user login information.

4. The method of claim 3, wherein the first authentication request is a Security Assertion Markup Language request in a SOAP envelope.

5. A method for granting access to a resource comprising:
   receiving, by a first server, a request to access the resource operatively connected to the first server, wherein the request comprises an authentication assertion reference from a client;
   sending, in response to the request, an authentication request to a second server, wherein the authentication request comprises a certificate associated with the first server;
   receiving, in response to the authentication request, an authentication assertion from the second server,
      wherein the second server, in response to the authentication request, determines whether the certificate is present in a trusted partner list maintained by the second server, wherein the second server, in response to determining whether the certificate is present in the trusted partner list, sends the authentication assertion to the first server; and granting, by the first server, access to the resource to the client based on the authentication assertion.

6. The method of claim 5, wherein prior to sending the authentication request, the first server identifies the second server using the authentication assertion reference.

7. The method of claim 5, wherein the client is authenticated by the second server prior to obtaining the authentication assertion reference.

8. The method of claim 7, wherein the second authentication request is a Security Assertion Markup Language request in a SOAP envelope.

9. A system for granting access to a resource comprising:
a first server operatively connected to a client, the resource and a second server,
wherein the first server is configured to:
receive, from the client, a request to access the resource, wherein the request comprises an authentication assertion reference;
send, in response to the request, an authentication request to the second server, wherein the authentication request comprises a certificate associated with the first server;
receive, in response to the authentication request, an authentication assertion from the second server,
wherein the second server, in response to the authentication request, determines whether the certificate is present in a trusted partner list maintained by the second server, and
wherein the second server, in response to determining whether the certificate is present in the trusted partner list, sends the authentication assertion to the first server; and
grant access to the resource to the client based on the authentication assertion.

10. The system of claim 9, wherein the client is authenticated by the second server prior to obtaining the authentication assertion reference.

11. The system of claim 10, wherein the client provides the second server with user login information.

12. The system of claim 11, wherein the second authentication request is a Security Assertion Markup Language request in a SOAP envelope.

13. The system of claim 9, wherein prior to sending the authentication request, the first server identifies the second server using the authentication assertion reference.

* * * * *